United States Patent [19]

Nakamura

[11] Patent Number: 5,052,848
[45] Date of Patent: Oct. 1, 1991

[54] TUBE FIXING STRUCTURE OF A BICYCLE
[75] Inventor: Fujio Nakamura, Tokyo, Japan
[73] Assignee: Sakae Ringyo Co., Ltd., Japan
[21] Appl. No.: 160,153
[22] Filed: Feb. 25, 1988
[30] Foreign Application Priority Data Dec. 28, 1987 [JP] Japan .................. 62-199891[U]

[51] Int. Cl.⁵ .................. F16B 11/00; B62K 19/22
[52] U.S. Cl. .................. 403/268; 403/267; 280/281.1
[58] Field of Search ............ 403/267, 268, 265, 266, 403/361, 37, 34, 269; 280/281.1

[56] References Cited

U.S. PATENT DOCUMENTS

| | | | |
|---|---|---|---|
| 2,994,353 | 8/1961 | Yearley | 403/268 |
| 3,519,294 | 7/1970 | Barnes | 403/265 X |
| 4,248,017 | 2/1981 | Micallef | 403/267 X |
| 4,494,890 | 1/1985 | Lusk | 403/267 |
| 4,648,616 | 3/1987 | Diekman et al. | 403/265 X |
| 4,705,286 | 11/1987 | Laurier et al. | 403/267 X |
| 4,715,974 | 12/1987 | Wehmeyer | 403/268 X |
| 4,721,407 | 1/1988 | Ciu | 403/267 X |
| 4,752,151 | 6/1988 | Ashida et al. | 403/267 |
| 4,822,202 | 4/1989 | Gustafsson | 403/268 |
| 4,900,049 | 2/1990 | Tseng | 403/268 X |

FOREIGN PATENT DOCUMENTS

| | | | |
|---|---|---|---|
| 1114386 | 4/1956 | France | 403/268 |
| 57-8191 | 1/1982 | Japan . | |

Primary Examiner—Peter M. Cuomo
Attorney, Agent, or Firm—Lowe, Price, LeBlanc & Becker

[57] ABSTRACT

A tube fixing structure of a bicycle includes a tube constituting the bicycle and a portion to be fitted into the tube. A space is formed between the tube and the portion to be filled with a bonding agent and communicates with a bonding agent pouring inlet. The space communicates with an air exhaust outlet so as to exhaust air in the space when the bonding agent is poured into the space.

4 Claims, 4 Drawing Sheets

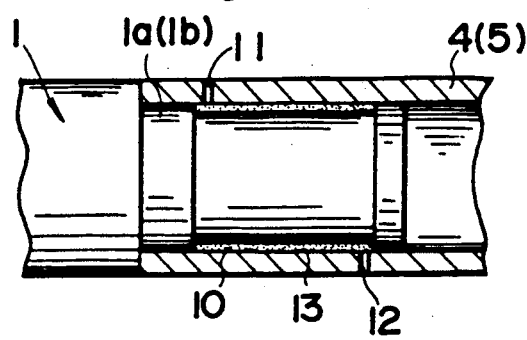
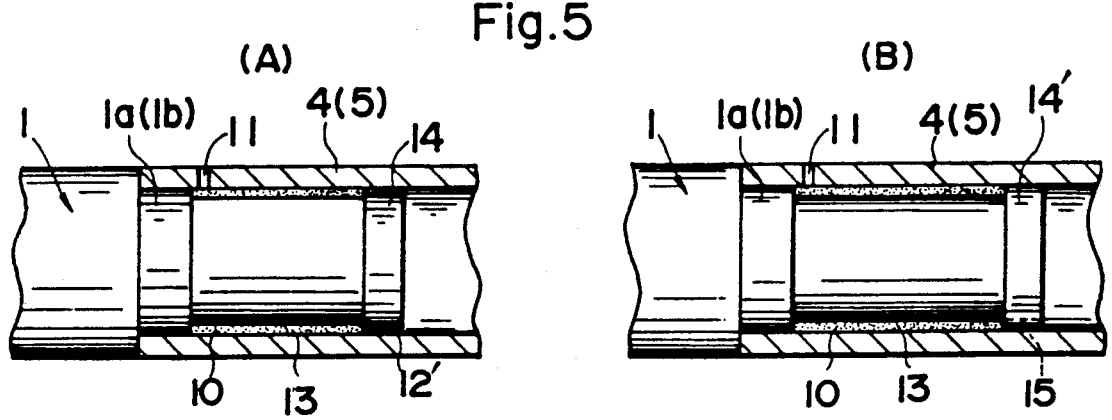
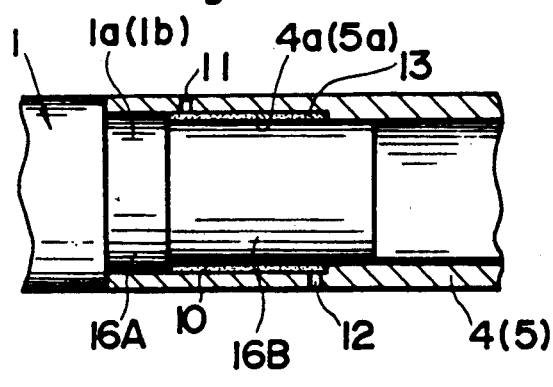
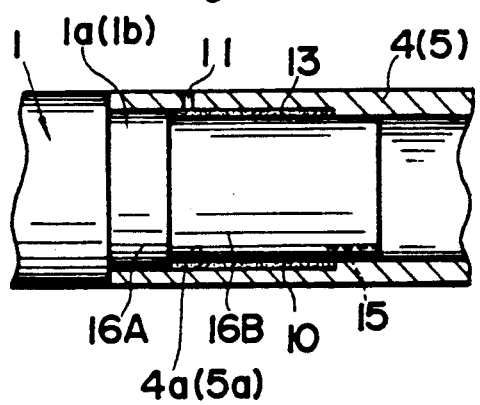
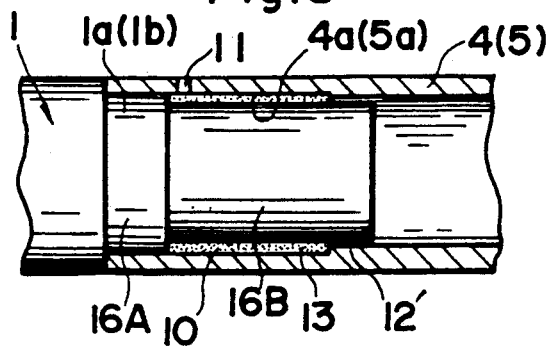

TUBE FIXING STRUCTURE OF A BICYCLE

FIELD OF THE INVENTION

The present invention relates to a tube fixing structure of a bicycle, and more particularly to a tube fixing structure in which a tube constituting a frame of a bicycle is fitted onto a portion such as a lug projecting from a head tube and is fixedly joined to the portion with a bonding agent.

BACKGROUND OF THE INVENTION

Heretofore, when a tube constituting a frame of a bicycle is fixedly mounted to a head tube to which a handlebar stem is attached, a bonding agent is applied to an outer periphery of a lug projecting from the head tube and an inner periphery of an end of the tube, and the lug is fitted into the end of the tube so that both of them are fixedly joined to each other (refer to Japanese Utility Model Application No. 8191/1982).

The bonding agent for fixedly joining the tube utilizes an epoxy thermosetting resin having a relatively large viscosity. Accordingly, any brush can not be used for applying the bonding agent, and heretofore a spatula is used to extend the bonding agent and apply it to the lug and the tube.

However, such a manner in which the spatula is utilized to extend the agent and apply it to the lug and the tube requires much labor and time. Further, in such a case as the bonding agent is extended and applied by the spatula, the bonding agent is applied more than a required thickness (0.05 to 0.15 mm) and hence extra bonding agent overflows from the joining portion. Accordingly, since it is necessary to wipe off the overflowed agent with a cloth additionally, the operation efficiency is reduced and the amount of used bonding agent is much to thereby be expensive.

Moreover, when the bonding agent is extended and applied, air is introduced into the agent and air bubbles are produced within the agent. Accordingly, the air bubbles are expanded upon thermohardening of the agent and a joining area is reduced substantially. Consequently, a joining force of only about 250 kg/cm² is obtained and hence it is necessary to extend a length of the fitted portion of the tube.

SUMMARY OF THE INVENTION

It is an object of the present invention to provide a tube fixing structure of a bicycle capable of fixedly joining a tube and a portion to be fitted therein with a predetermined amount of bonding agent strongly.

According to the present invention, since a space filled with a bonding agent is formed between a tube and a portion to be fitted therein and the bonding agent is poured into the space through a bonding agent pouring inlet communicating with the space while air in the space is exhausted from an air exhaust outlet, the tube can be fixedly joined strongly to the portion to be fitted therein by a predetermined amount of bonding agent with stable strength and high operation efficiency.

BRIEF DESCRIPTION OF THE DRAWINGS

FIG. 4 is a sectional view showing another embodiment of the present invention;

FIGS. 5(A) and (B) are sectional views showing modifications of FIG. 4, respectively;

FIG. 6 is a sectional view showing still another embodiment of the present invention;

FIGS. 7 and 8 are sectional views showing modifications of FIG. 6, respectively;

DETAILED DESCRIPTION OF THE PREFERRED EMBODIMENTS

Embodiments of the present invention are now described in detail with reference to the drawings.

Figure 2:
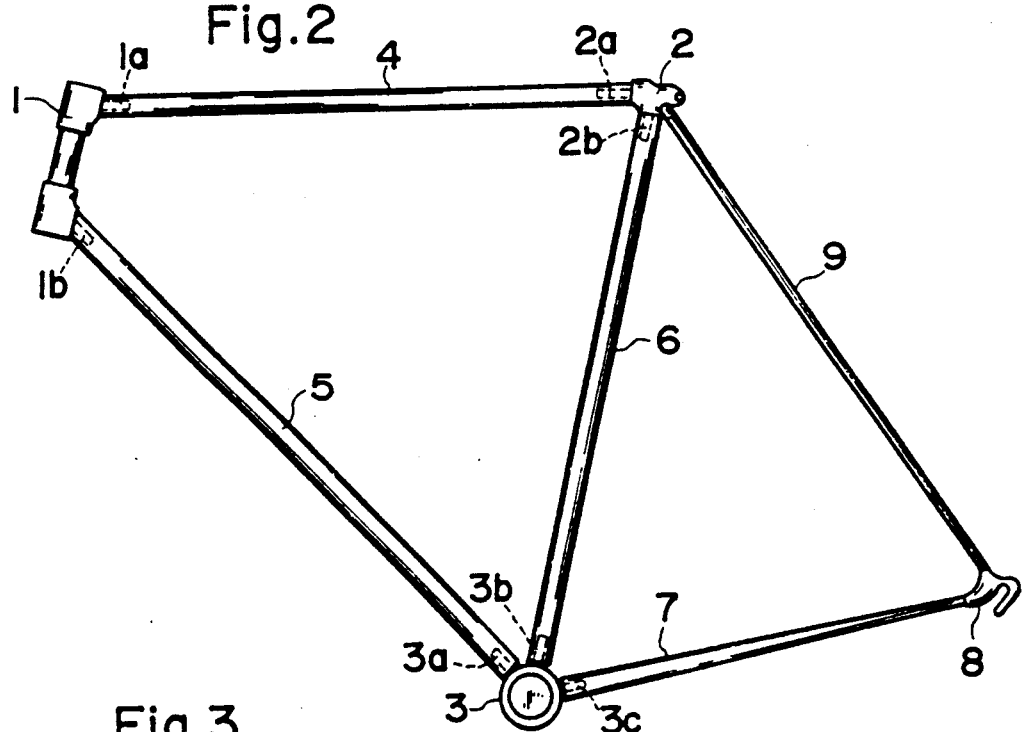
FIG. 2 shows a whole structure of a frame of a bicycle.
Figure 3:
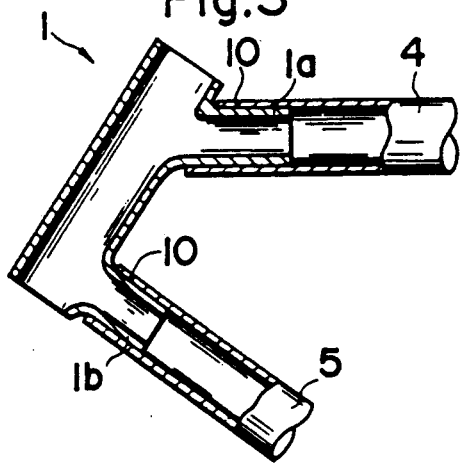
FIG. 3 is a sectional view showing part of the frame of FIG. 2.

Referring to FIG. 2, there is shown a frame structure of a bicycle which includes a head tube 1 formed of aluminum. The head tube 1 includes lugs or projections 1a and 1b which are integrally formed at upper and lower portions thereof, respectively, as shown in FIG. 3. Further, the frame includes a seat bracket 2 and a bottom bracket 3. The seat bracket 2 includes lugs 2a and 2b integrally formed therewith and the bottom bracket 3 also includes lugs 3a to 3c integrally formed therewith.

The lug 3a of the bottom bracket 3 is forcedly inserted into a lower end of a down tube 5 and the lug 2a of the seat bracket 2 is also forcedly inserted into an end of a top tube 4. The lug 2b of the seat bracket 2 and the lug 3b of the bottom bracket 3 are forcedly inserted into upper and lower ends of a vertical tube or seat tube 6, respectively, and the lug 3c of the bottom bracket 3 is forcedly inserted into an end of a chain stay 7. A lug (not shown) of a coupling member 8 is forcedly inserted into the other end of the chain stay 7, and the other lug of the coupling member 8 and a lug (not shown) having a small diameter of the seat bracket 2 are forcedly inserted into both ends of a back fork or a seat stay 9, respectively.

Figure 1:
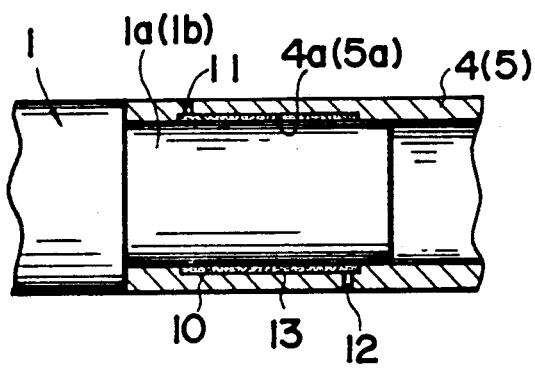
FIG. 1 is a sectional view of a tube fixing structure according to an embodiment of the present invention.

As shown in FIGS. 1 and 3, the lug 1a (1b) of the head tube 1 is fitted into the other end of the top tube 4 (down tube 5). An annular cavity 4a (5a) having a depth of 0.1 mm is formed in an inner periphery of the top tube 4 (down tube 5) so that a space 10 filled with a bonding agent is formed between the inner periphery of the top tube 4 (down tube 5) and an outer periphery of the lug 1a (1b) when the lug 1a (1b) of the head tube 1 is fitted into the other end of the top tube 4 (down tube 5). Further the top tube 4 (down tube 5) includes a bonding agent pouring inlet 11 and an air exhaust outlet 12 each formed to penetrate a wall of the top tube 4 (down tube 5) in the thickness or radial direction thereof and communicating with the space 10. The inlet 11 and the outlet 12 are formed in the top tube 4 (down tube 5) in opposing relationship with each other.

With the tube fixing structure as constructed above, a nozzle of a bonding agent injection device (not shown) is pushed against the inlet 11 to pour the bonding agent 13 made of an epoxy thermosetting resin through the inlet 11 into the space 10 so that the space 10 is filled with the agent 13. In this case, since the agent 13 is poured into the space 10 with a fixed pressure, the agent is poured into the space 10 so that the space is filled with the agent while air in the space 10 is exhausted through the outlet 12. Thus, when the space 10 is completely filled with the agent 13, the agent 13 is to be exhausted through the outlet 12 having a large fluid resistance. Accordingly, if a fixed amount of bonding agent 13 in corresponding to a capacity of the space 10 is poured into the space 10, unnecessary use of the agent 13 can be prevented and no wiping-off operation is also required. Further, since only the pouring operation of the agent 13 is required, the filling operation is finished about five seconds and hence the operation efficiency is extremely improved. In addition, since the fixed amount of agent is poured with the fixed pressure, the air bubble is not almost produced in the bonding agent. Accordingly, the tube and the lug are fixedly joined to each other strongly and the joining strength is stable, so that a length of the fitted portions of the lug into the tube can be made shorter.

In the embodiment, the lugs and the tubes of the seat bracket 2 and the bottom bracket 3 may be fixedly joined to each other by pouring the bonding agent 13 through the inlet 11 into the space 10 while exhausting air in the space through the outlet 12.

It is a matter of course that the present invention can be also applied to the case where a handle tube is fixed to a handle lug or other tubes are fixed to portions to be fitted therein.

Further, the space 10 can be filled with agent 13 even if air in the space 10 is sucked from the outlet 12 without pouring the agent 13 with the fixed pressure or even if the pouring operation of the agent 13 from the inlet 11 and the suction of air from the outlet 12 are made simultaneously.

FIG. 4 shows another embodiment of the present invention, in which an annular cavity is formed in a substantially central portion of the lug 1a (1b) so that the space 10 filled with the agent is formed between the top tube 4 (down tube 5) and an outer periphery of the lug 1a (1b). Other structure of the embodiment of FIG. 4 is the same as that of the embodiment of FIG. 1.

FIGS. 5(A) and (B) show modifications of FIG. 4, respectively. The modification of FIG. 5(A) includes an end 14 of the lug 1a (1b) of which a diameter is formed slightly small so that a gap of 0.02 to 0.05 mm is formed between the end of the lug 1a (1b) and the inner periphery of the top tube 4 (down tube 5). The gap constitutes an air exhaust outlet 12'. The modification of FIG. 5(B) includes an end portion 14' of the lug 1a (1b) which is in close contact with the inner periphery of the top tube 4 (down tube 5) and an air exhaust outlet 15 formed as a recess in part of the end portion 14' of the lug 1a (1b) so as to communicate with the space 10. The modifications of FIG. 5 do not require any air exhaust outlet formed in the tube.

FIG. 6 shows still another embodiment of the present invention, in which the lug 1a (1b) includes a large-diameter portion 16A and a small-diameter 16B and the top tube 4 (down tube 5) includes a cavity 4a (5a) formed in an inner periphery of an end of the top tube 4 (down tube 5) so that the thickness of the end of the top tube 4 (down tube 5) is made small. Thus, a space 10 filled with the bonding agent is formed between the small-diameter portion 16B of the lug 1a (1b) and the cavity 4a (5a) of the top tube 4 (down tube 5). In the embodiment, the lug 1a (1b) can be easily fitted into the top tube 4 (down tube 5) since the small-diameter portion 16B is formed in the lug and the cavity 4a (5a) is formed in the tube.

FIG. 7 shows a modification of FIG. 6, in which an air exhaust outlet 15 is formed in the periphery of the end of the small-diameter 16B to communicate with the space 10 filled with the bonding agent.

FIG. 8 shows another modification of FIG. 6, in which the small-diameter portion 16B includes a diameter which is slightly smaller than that of the inner periphery of the top tube 4 (down tube 5). Thus, an air exhaust outlet 12' is formed with a gap between the end of the small-diameter portion 16B and the inner periphery of the top tube 4 (down tube 5).

Figure 9:
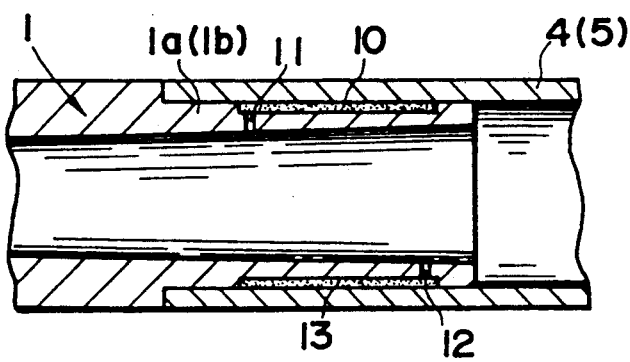
FIG. 9 is a sectional view of a further embodiment of the present invention.

FIG. 9 shows a further embodiment of the present invention, in which an annular cavity is formed in a substantially central portion of the lug 1a (1b) to form the space 10 between the top tube 4 (down tube 5) and the outer periphery of the lug. The agent pouring inlet 11 and the air exhaust outlet 12 are formed in the lug 1a (1b) to penetrate the lug 1a (1b) in the thickness direction or the radial direction thereof and communicate with the space 10. In the embodiment, the bonding agent 13 is poured into the space 10 from the inside of the lug 1a (1b) through the inlet 11 to fill the space 10 with the agent while air in the space 10 is exhausted from the outlet 12. The inlet 11 and the outlet 12 of the embodiment are not exposed outside and accordingly the external appearance thereof is preferable.

Figure 10:
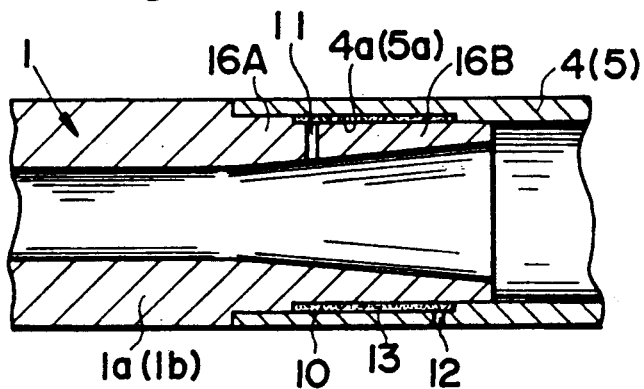
FIGS. 10 and 11 are sectional views showing modifications of FIG. 9, respectively.

FIG. 10 shows a modification of FIG. 9, in which the lug 1a (1b) includes a large-diameter portion 16A and a small-diameter portion 16B and the top tube 4 (down tube 5) includes a cavity 4a (5a) formed in the inner periphery of an end of the top tube 4 (down tube 5) so as to make small the thickness of the periphery of the tube, whereby the space 10 is formed between the small-diameter portion 16B and the cavity 4a (5a). The bonding agent pouring inlet 11 is formed in the lug and the air exhaust outlet 12 is formed in the top tube 4 (down tube 5). In the modification, since the small-diameter portion 16B is formed in the lug and the cavity 4a (5a) is formed in the tube, it is simplified to fit the lug 1a (1b) into the top tube 4 (down tube 5).

Figure 11:
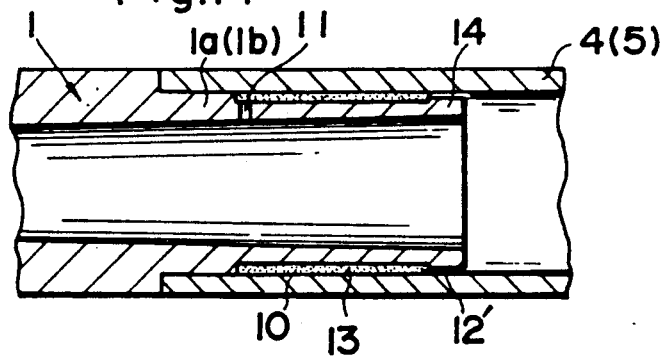

FIG. 11 shows still another modification of FIG. 9, in which an end 14 of the lug 1a (1b) includes a diameter which is slightly smaller than that of the inner periphery of the top tube 4 (down tube 5). A gap between the end 14 and the inner periphery of the top tube 4 (down tube 5) constitutes an air exhaust outlet 12'.

Figure 12:
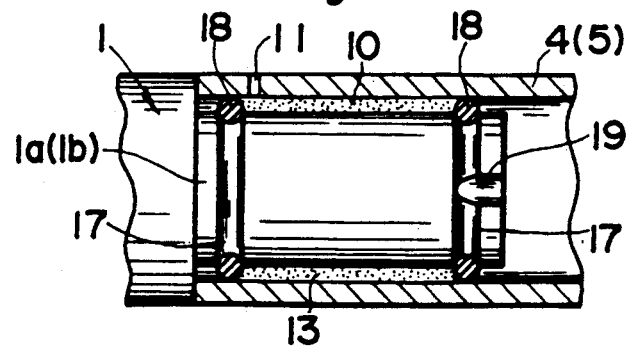
FIG. 12 is a sectional view showing a still further embodiment of the present invention.

FIG. 12 shows a still further embodiment of the present invention, in which the lug 1a (1b) is formed with a small diameter over the whole length thereof and is formed at its outer periphery near both ends thereof with annular grooves 17 having a substantially semicircular shape in section. Annular seal members 18 are fitted into the annular grooves 17 and the lug 1a (1b) is fitted into the top tube 4 (down tube 5) airtightly while the top tube 4 (down tube 5) is in close contact with the annular seal members. The annular seal members 18 are made of resilient material such as plastic, and the space 10 filled with the bonding agent is formed between the annular seal members 18. An air exhaust outlet 19 formed of a cavity is formed in the periphery of the end of the lug 1a (1b) to communicate with the space 10. In the embodiment, a tolerance of fitting the lug 1a (1b) into the top tube 4 (down tube 5) can be made large and accordingly the lug and the tube can be both manufactured easily.

Figure 13:
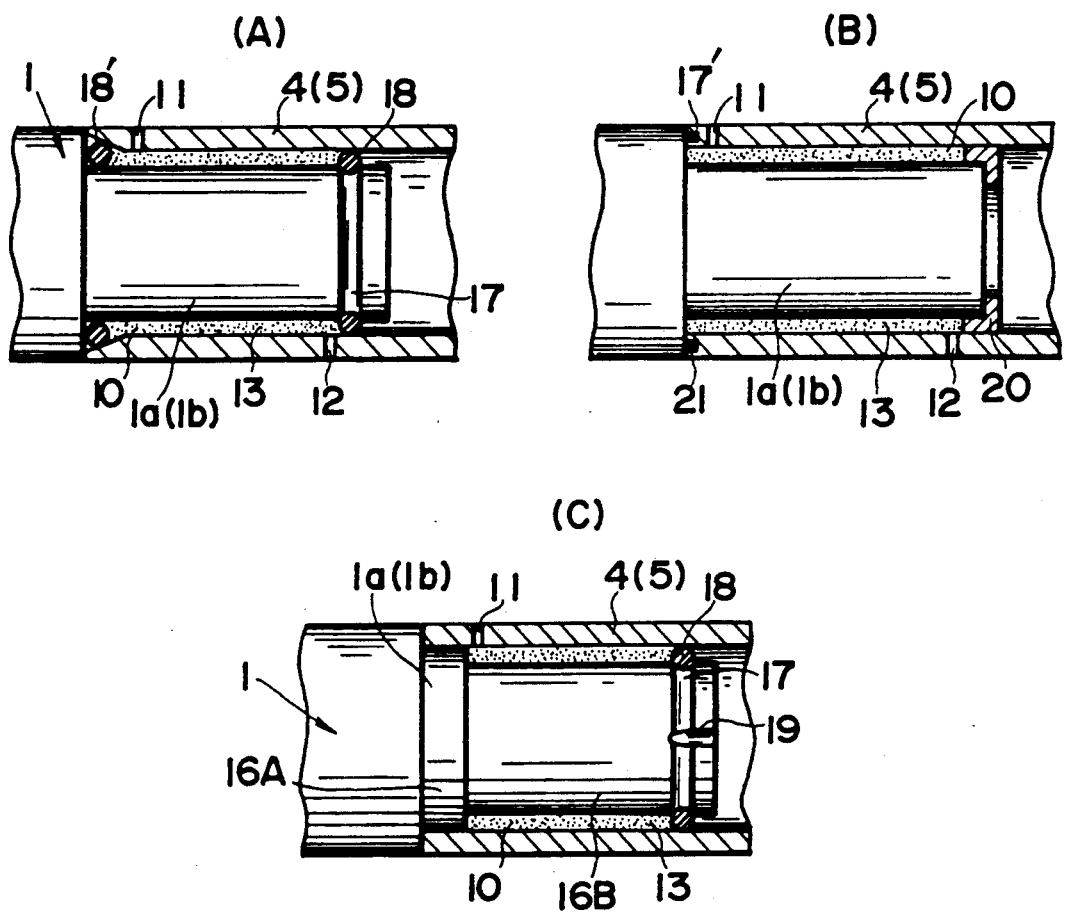
FIGS. 13(A), (B) and (C) are sectional views showing modifications of FIG. 12, respectively.

FIGS. 13(A), (B) and (C) show modifications of FIG. 12, respectively. The modification of FIG. 13(A) includes a tapered opening end of the top tube 4 (down tube 5) and an annular seal member 18' is disposed between the opening end and the outer periphery of the lug 1a (1b). The bonding agent pouring inlet 11 and the air exhaust outlet 12 are formed in the top tube 4 (down tube 5). The modification of FIG. 13(B) includes an annular groove 17' formed in an end of the top tube 4 (down tube 5) and an annular seal member 21 fitted into the annular groove 17'. The annular seal member 21 abuts against a step of the lug 1a (1b). An end of the lug 1a (1b) is covered with an annular seal member 20 formed into an L-letter in section and the annular seal member 20 abuts against the inner periphery of the top tube 4 (down tube 5). In the modification of FIG. 13(C), the lug 1a (1b) includes a large-diameter portion 16A and a small-diameter portion 16B and the annular seal member 18 is fitted into the annular groove 17 formed in the periphery near the end of the small-diameter portion 16B. The space 10 filled with the agent is formed between the annular seal member 18 and the large-diameter portion 16A.

Figure 14:
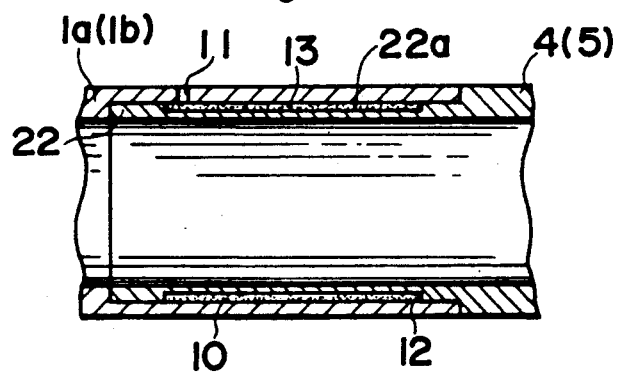
FIG. 14 is a sectional view showing a further embodiment of the present invention.

FIG. 14 shows a still further embodiment of the present invention, in which the lug 1a (1b) is fitted onto a thin peripheral portion 22 of the end of the top tube 4 (down tube 5) and an annular cavity 22a is formed in the outer periphery of the thin peripheral portion 22. Thus, the space 10 is formed between the inner periphery of the lug 1a (1b) and the thin peripheral portion 22.

I claim:

1. In an end-fitting arrangement for a pin or lug fixed to and projecting from a first frame member and interfitting with a second tubular frame member of a frame, the improvement comprising a space formed between interfitting portions of said pin and tube adapted to receive a bonding agent, an inlet formed at one axial end of and communicating with said space through which inlet the bonding agent is disposed into said space and an outlet formed at the other axial end of and communicating with said space through which air in said space is exhausted, wherein said tube has a substantially constant inner diameter along an end portion thereof interfitting with said pin, said pin including a first portion of reduced diameter between opposite ends defined by larger diameter portions, one larger diameter portion formed furthest from the pin end having an outer diameter substantially equal to the inner diameter of the tube with the other larger diameter portion having an outer diameter greater than the reduced diameter portion but less than the inner diameter of the tube to define an annular gap with the inner diameter of the tube being the outlet port, the inlet port being formed in the tube at the other end of the space.

2. In an end-fitting arrangement for a pin or lug fixed to and projecting from a first frame member and interfitting with a second tubular frame member of a frame, the improvement comprising a space formed between interfitting portions of said pin and tube adapted to receive a bonding agent, an inlet formed at one axial end of and communicating with said space through which inlet the bonding agent is disposed into said space and an outlet formed at the other axial end of and communicating with said space through which air in said space is exhausted, wherein said tube has an inner diameter which is substantially constant along an end thereof interfitting with said pin, said pin having a first portion of reduced diameter defined between a pair of larger diameter portions on said pin, each said larger diameter portion having an outer diameter substantially equal to the inner diameter of the tube to interfit and contact an inner surface of the tube and define an annular cavity being said space, the inlet port being formed in the tube at one end of the cavity and the outlet port being a peripheral recess in the endmost larger diameter portion defining an outlet gap with an inner surface of the tube.

3. The arrangement of claim 2, wherein said pin or lug is integral with the first frame member from which it extends.

4. The arrangement of claim 2, wherein said pin is received in a hollow end region of the second tubular frame member which hollow region extends into the tubular frame member a distance greater than the length of the pin.

* * * * *